United States Patent [19]
Aishima et al.

[11] Patent Number: 6,042,636
[45] Date of Patent: Mar. 28, 2000

[54] METHOD AND APPARATUS OF TREATING INCINERATOR EXHAUST GAS

[75] Inventors: Shizuo Aishima, Yokohama; Takahito Goshi, Koganei; Masaaki Ohkawara, Yokohama; Toshiyuki Tanaka, Fujisawa; Takashi Itoh, Fujieda; Kazukuni Furukawa; Masashi Fujii, both of Machida; Gentaro Nemoto, Yokohama, all of Japan

[73] Assignee: Ohkawara Kakohki Co., Ltd., Japan

[21] Appl. No.: 09/042,908

[22] Filed: Mar. 17, 1998

[30]     Foreign Application Priority Data

Mar. 27, 1997 [JP] Japan ................................. 9-076302
Mar. 27, 1997 [JP] Japan ................................. 9-076303
Apr. 30, 1997 [JP] Japan ................................. 9-112316

[51] Int. Cl.$^7$ .......................... B01D 47/06; B01D 53/10
[52] U.S. Cl. ................... 95/92; 95/219; 95/234; 96/270; 96/282; 96/303; 96/314; 96/319
[58] Field of Search .................. 95/219, 234, 92; 96/268, 270, 271, 272, 273, 281, 282, 286, 303, 306, 311, 313, 314, 319, 321, 376, 378

[56]         References Cited

U.S. PATENT DOCUMENTS

Re. 16,315   4/1926  Senseman .................. 95/219
1,726,828    9/1929  Hawley ..................... 96/319
1,734,677   11/1929  Kreisinger ................. 96/311
1,952,308    3/1934  Bowen ..................... 96/303
1,961,956    6/1934  Bleibtreu et al. ........... 96/313
1,999,589    4/1935  Frey ....................... 96/311
2,588,106    3/1952  Frangquist ................ 95/219
3,387,432    6/1968  Ferrara .................... 96/281
4,682,991    7/1987  Grethe et al. .............. 95/219
4,762,538    8/1988  Michler et al. ............. 96/281
5,466,270   11/1995  Abdelmalek ................ 96/319

*Primary Examiner*—Duane S. Smith
*Attorney, Agent, or Firm*—Wall Marjama Bilinski & Burr

[57]         ABSTRACT

A method and apparatus of cooling incinerator exhaust gas for a cleaning treatment of high temperature exhaust gas discharged from an incinerator of refuse and/or waste in a post-step are provided. A spray cooling chamber includes a chamber having a lower end portion formed into a nearly cylindrical shape of an inverted conical shape, a gas distribution chamber equipped with a revolving blade, arranged at an upstream side of the chamber, a sprayer of a cooling liquid arranged at central upper portion of the chamber, a dust exhaust port arranged at the lower end portion of the chamber, and an exhaust pipe arranged on the chamber. Waste heat recovery from exhaust gas is limited to a temperature range capable of suppressing generation of dioxins, and high temperature exhaust gas is rapidly cooled, particularly at a temperature drop rate such that the vicinity of 300° C. is dropped in a short time within 1 second, so that exhaust concentration of dioxins from an incinerator plant can be decreased to 0.1 ng-TEQ/Nm$^3$ or less.

17 Claims, 11 Drawing Sheets

METHOD AND APPARATUS OF TREATING INCINERATOR EXHAUST GAS

BACKGROUND OF THE INVENTION AND RELATED ART STATEMENT

The present invention relates to a method and apparatus of cooling exhaust gas from a refuse and/or waste incinerator (hereinafter referred to as "incinerator exhaust gas"). More particularly, the present invention relates to a method and apparatus of cooling incinerator exhaust gas, which particularly suppress regeneration of dioxins and can remove harmful substances, such as dioxins or mercury, together with hydrogen chloride gas, sulfur oxide gas, dust, fly ash, and the like, in high efficiency with a bag filter.

Exhaust gases discharged from municipal refuse incinerator contain minor components, such as smoke dust, hydrogen chloride (HCl), SOx, NOx, heavy metals including mercury, or dioxin. From the standpoint of environmental protection, it is necessary to remove those harmful substances.

Of those, dioxins (general name of PCDD: polychlorodibenzodioxin, and PCDF: polychlorodibenzofuran) have extremely strong toxicity, and it is also reported that dioxins have carcinogenesis. Therefore, collection and removal of dioxins is extremely important.

A conventional example of a municipal refuse incinerator plant having an exhaust gas treating apparatus is shown in FIG. 11.

In the apparatus shown in FIG. 11, refuse gathered in a dump pit 1 is sent to an incinerator 2 by, for example, a crane (not shown in the drawings). Refuse is incinerated in the incinerator 2, and then completely combusted in a secondary combustion chamber 3 by secondary air. Ash after combustion in the incinerator 2 is discharged outside from an ash outlet 11. Exhaust gas, generated as a result of complete combustion of refuse in the secondary combustion chamber 3, is subjected to heat recovery by waste heat boiler 4 and waste heat reclaimer (pre-heater) 5, and then reaches a quenching reaction tower 6.

In the quenching reaction tower 6, slaked lime slurry is sprayed from slaked lime tank 7, so that hydrogen chloride (HCl) and sulfur oxide (SOx) contained in the exhaust gas are removed. The exhaust gas is then led to bag filter 8 at downstream side, where smoke dust and/or fly ash (hereinafter referred to as "dust"), HCl, SOx, heavy metals and dioxins, which remain in the exhaust gas, are removed. Reference numeral 9 is an induced draft fan which suctions the exhaust gas after treatment as mentioned above, and discharges the same into the atmosphere through a chimney 10.

However, even where the exhaust gas from the incinerator is treated with the above-mentioned exhaust gas treating apparatus, there is the possibility that dioxins cannot be reduced to the desired low concentration. Dioxins generated in the course of incineration of refuse are almost decomposed in the secondary combustion chamber, but it is necessary to decrease the temperature of the incinerator exhaust gas from a high temperature of about 350 to 900° C. to a low temperature in each step of heat recovery step, cooling reaction step, and dust collection step, which are exhaust gas treatment steps. However, regeneration of dioxins having strong toxicity tends to occur particularly in the vicinity of 300° C. Therefore, in the above-mentioned conventional exhaust gas treatment apparatus, dioxins regenerate in each step, and as a result, such a problem arises in that dioxins cannot be collected and removed to the desired low concentration.

Further, it is difficult in the conventional cooling tower to decrease a temperature to 150° C. or less, and the temperature is generally about 150 to 200° C. As a result, the problem occurs in that dioxins cannot be collected and removed to the desired low concentration.

The waste heat reclaimer, as a cooling technique of exhaust gas, has the problem that cooling time is somewhat long, so that flow of gas becomes partially heterogeneous, and also dust is deposited and accumulated on the surface of instruments. Further, if there is a change in temperature or gas flow rate, an outlet temperature changes. As a result, generation of dioxins increases, and water injection cooling means are required in order to control the temperature.

If the water injection cooling tower is used as exhaust gas cooling means, cooling is conducted with rough water droplets having an average particle size of 150 $\mu$m or more, generally 250 $\mu$m or more, so that the temperature of gas cannot be controlled, and dust is converted to a wet or a slurry state. As a result, if the outlet temperature is as low as 150° C. or less, it is impossible to use a bag filter, since it becomes difficult to treat the dust. Further, there is a method of spraying water or slurry to duct or tower portion as water spraying cooling means, but such a method involves the defect that gas cannot uniformly be cooled.

Furthermore, in order to remove harmful substances contained in exhaust gas, particularly dioxin or mercury, a powder for removing harmful substances (hereinafter referred to as "harmful substance removing powder") is introduced into an exhaust pipe at a post-stream side of the water injection cooling tower to mix with exhaust gas in the exhaust pipe, and the harmful substances are then collected and removed with dust collector, for example, using bag filter or electrostatic precipitator. However, contact and retention time with the exhaust gas can be as short as 10 seconds or less, and removal efficiency is insufficient.

Regarding the above-described exhaustion suppression of dioxins, the Ministry of Health and Welfare in Japan decided 'Guideline on Prevention of Generation of Dioxins' in 1990. It was therefore expected that exhaust concentration of dioxins was about 0.5 ng-TEQ (Toxicity Equivalent Conversion Concentration)/Nm$^3$ or less. The Ministry of Health and Welfare reconsidered the above guideline in October 1996, and it is considered that exhaustion concentration of dioxins in refuse incineration continuous furnace which will be constructed in future should be about 0.1 ng-TEQ (Toxicity Equivalent Conversion Concentration)/Nm$^3$ or less.

The present invention has been made in view of the problems involved with the prior art. Accordingly, an object of the present invention is to provide a method and apparatus of treating incinerator exhaust gas, which can remove hydrogen chloride gas, sulfur oxide gas, and harmful substances such as dioxins or mercury, at high efficiency by sufficiently securing contact retention time with the incinerator exhaust gas, and recover dust in a dried state, and also can rapidly cool incinerator exhaust gas having a high temperature (hereinafter referred to as "high temperature incinerator exhaust gas"), without deterioration of adsorption and absorption performances of a harmful substance removing powder.

Another object of the present invention is to decrease regeneration amount of dioxins, leading to further reduction in concentration of dioxins discharged, by limiting waste heat recovery from exhaust gas to a range capable of suppressing generation of dioxins, and also cooling high temperature exhaust gas rapidly, in particular at a temperature drop rate which passes through the vicinity of 300° C. within short period of time of 1 second or less.

SUMMARY OF THE INVENTION

According to a first aspect of the present invention, there is provided a method of cooling incinerator exhaust gas for cleaning treatment of high temperature exhaust gas discharged from an incinerator of wastes in a post-step, which comprises introducing the incinerator exhaust gas into a spray cooling chamber having a gas distribution chamber at upstream side to give a revolving flow, and mixing the incinerator exhaust gas with a cooling liquid sprayed in the spray cooling chamber, thereby rapidly cooling the incinerator exhaust gas to a predetermined temperature or less, and at the same time, separating dust contained in the incinerator exhaust gas in a dried state.

According to a second aspect of the present invention, there is provided an apparatus of cooling incinerator exhaust gas for cleaning treatment of high temperature exhaust gas discharged from an incinerator of wastes at a post-step, which comprises a chamber wherein a lower end portion thereof is formed in a nearly cylindrical shape of inverted conical shape, a gas distribution chamber arranged at upstream side of the chamber, a spray means of a cooling liquid arranged at central upper portion of the chamber, a dust exhaust port arranged at a lower end portion of the chamber, and an exhaust duct arranged on the chamber.

According to a third aspect of the present invention, there is provided a treatment method of incinerator exhaust gas by cooling high temperature exhaust gas discharged from an incinerator of wastes, adding a harmful substance removing powder thereto, and/or collecting dust, thereby cleaning the incinerator exhaust gas, the method comprising introducing the incinerator exhaust gas into a spray cooling chamber having a gas distribution chamber at an upstream side thereof to thereby give a revolving flow to the incinerator exhaust gas, mixing the incinerator exhaust gas with a cooling liquid sprayed in the spray cooling chamber to thereby rapidly cooling the incinerator exhaust gas to a predetermined temperature or less, blowing a harmful substance removing powder from a midstream side of the spray cooling chamber to contact and mix the same with the incinerator exhaust gas, thereby reaction adsorbing harmful substances contained in the incinerator exhaust gas, and then separating the harmful substance removing powder which reacts with and adsorbs the harmful substances in a dust collector arranged at a downstream side of the spray cooling chamber, together with dust.

According to a fourth aspect of the present invention, there is provided an apparatus of treating incinerator exhaust gas, which cools high temperature exhaust gas discharged from an incinerator of wastes, adding a harmful substance removing powder thereto, and collecting dust, thereby cleaning the exhaust gas, the apparatus comprising a chamber having a downstream end portion formed into a nearly cylindrical shape of an inverted conical shape, a gas distribution chamber arranged at an upstream side of the chamber, a spray means of a cooling liquid arranged at a central upper portion of the chamber, a blowing port of a harmful substance removing powder arranged at a midstream side of the chamber, a dust exhaust port arranged at a downstream end portion of the chamber, an exhaust duct arranged on the chamber, and a dust collector arranged at a post-stream side of the chamber.

In the present invention, it is preferable that a gas flow rate from the gas distribution chamber is 10 to 50 m/sec, and a revolving speed of gas is 1 to 30 rad/sec, and it is preferable that a gas having an inlet temperature of 250 to 950° C. is rapidly cooled to an outlet temperature of 70 to 250° C. In the case of a large-scale incinerator, it sometimes happens that heat is recovered in a boiler for the purpose of the generation of electricity or the like and an exhaust gas is cooled down to 250–450° C. within several seconds. In this case, regeneration amount of dioxins after that is small. However, the exhaust gas is desirebly quenched to make a temperature to be 70–200° C., which is lower so as to mainly enhance an adsorption-removal efficiency for reducing the regeneration amount of dioxins. Further, it is preferable that the harmful substance removing powder is carried by pressurized air, and introduced with revolution into a central direction of the spray cooling chamber from the powder blowing port arranged at a side wall at a midstream side of the spray cooling chamber.

Further, in the present invention, in order to decrease an amount of slaked lime or powder and/or active carbon used, it is preferable to use return dust containing spent unreacted slaked lime or unreacted active carbon as the harmful substance removing powder blown into the spray cooling chamber, and to use a fresh harmful substance removing powder at a post-stream side of the spray cooling chamber. Furthermore, it is preferable that the harmful substance removing powder is either slaked lime milk or powder, lime stone powder, active carbon, or return dust, or a combination of them or etc.

In this treating apparatus, it is preferable that the blowing port of the harmful substance removing powder is arranged such that the harmful substance removing powder is blown at an angle of 5 to 45° to the central direction of the chamber, a part of the side wall constituting the gas distribution chamber has a jacket structure, and the spray means of the cooling liquid is either rotating disk type, binary fluid nozzle type, or spray nozzle type with a double pipe structure. Of those types, the spray nozzle with the double pipe structure is particularly preferred.

The spray nozzle with a double pipe structure means a double pipe structure that a cooling liquid passes the inside, and pressurized air passes its periphery.

It is preferable that the cooling liquid is sprayed with an average particle size of 20 to 180 $\mu$m, and the spray angle is 5 to 180°. However, where the spray means of the cooling liquid is a spray nozzle with a double pipe structure, the spray nozzle is preferably such that the cooling liquid having a flow rate of 0.1 to 100 kg/min per pipe is sprayed in the inside of the double pipe structure while revolving, and the pressurized air having a pressure of 5 to 40 kPa is sprayed in the periphery thereof while revolving, thereby conducting atomization of the cooling liquid (water, lime, milk (slurry), waste treated water, etc.).

BREIF DESCRIPTION OF THE DRAWINGS

DETAILED DESCRIPTION OF PREFERRED EMBODIMENT

Figure 1:
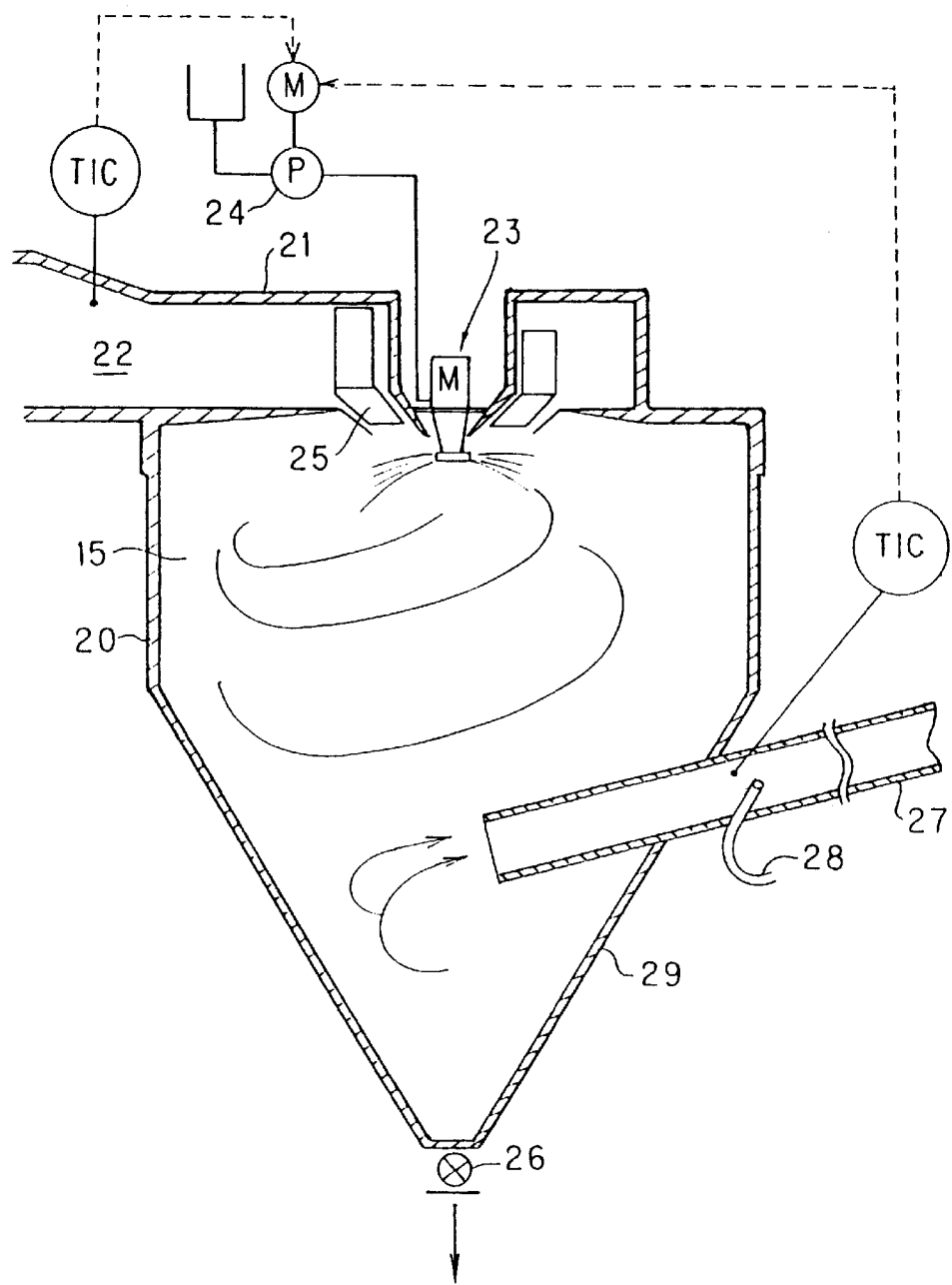
FIG. 1 is a cross-sectional schematic view showing one example of the spray cooling chamber used in the present invention.

The basic function of cooling the incinerator exhaust gas in the first and second aspects of invention will now be explained below.

As described before, the incinerator exhaust gas has a high temperature of about 250 to 950° C., and if the exhaust gas temperature is about 300° C. in the course of temperature drop from a high temperature to a low temperature, regeneration of dioxins having strong toxicity occurs. Therefore, the present invention employs the cooling method such that in rapidly cooling high temperature exhaust gas, the temperature ranging between 250° C. and 350° C., which is in the vicinity of 300° C., is dropped within 1 second and the exhaust gas is allowed to pass for a short time to extremely shorten the retention time of the exhaust gas in the vicinity of about 300° C., thereby minimizing regeneration of dioxins as much as possible.

The basic concept of the third and fourth aspects of the present invention will now be explained below.

In the case of a large-scale incinerator, it sometimes happens that an exhaust gas is cooled down to 250–450° C. In this case, regeneration amount of dioxins after that is small. However, in order to make the regeneration amount of dioxins smaller, the exhaust gas is quenched to a temperature between 70–200° C. to enhance an adsorption-removal efficiency.

In order to achieve such a rapid cooling of the exhaust gas, the present invention introduces the incinerator exhaust gas into the spray cooling chamber having the lower end portion formed into a nearly cylindrical shape of an inverted conical shape, and mixes with the spray cooling liquid while giving a revolving flow to the incinerator exhaust gas.

Further, in the present invention, increasing the temperature drop rate (cooling rate) in the vicinity of 300° C. means that the temperature drop rate is uniformly fast in each portion of the exhaust gas, and this is important on the point of suppressing regeneration of dioxins from the exhaust gas. Therefore, to achieve this objective it is preferable that the cooling liquid is sprayed in a circular shape at a spray angle of 5 to 180° using a rotating disc type liquid spraying machine or the like as the spray means of the cooling liquid, and mixing with exhaust gas having a gas speed of 10 to 50 m/sec and gas revolution speed of 1 to 30 rad/sec.

Where a specific double pipe structure spray nozzle is used as the spray means of the cooling liquid, it is preferable that the cooling liquid having a flow rate of 0.1 to 100 kg/min is sprayed while revolving the same inside the double pipe structure, and pressurized air having a pressure of 5 to 40 kPa is sprayed while revolving the same at the periphery thereof, thereby atomizing the cooling liquid.

Water is generally used as the cooling liquid to spray, however, lime milk, waste water containing alkali slurry such as limemilk, or spent salts discharged from water treatment facilities laid in an incinerator plant, for example, could also be used.

According to the present invention, the retention time of the incinerator exhaust gas in the vicinity of 300° C. is extremely shortened to minimize regeneration of dioxins as much as possible. As a result, when the exhaust gas is allowed to pass through the subsequent treatment steps (for example, lime powder or active carbon addition treatment or treatment with a bag filter), the concentration of dioxins discharged into the atmosphere can be 0.1 ng-TEQ/Nm$^3$ or less as regulated by the guideline of the Ministry of Health and Welfare.

Conventionally, in order to remove harmful substances, particularly dioxin or mercury, contained in the incinerator exhaust gas, a harmful substance removing powder has been introduced into an exhaust duct of a water spray cooling tower, and mixed with the exhaust gas in the exhaust duct, and then recovery and removal have been conducted with a dust collector. However, the contact retention time with the exhaust gas was short as 10 seconds or less, and the removal efficiency was insufficient. Therefore, according to another embodiment of the present invention, when introducing the harmful substance removing powder into the spray cooling chamber, the adsorption and absorption performances of the harmful substance removing powder are maintained, and the contact time with the exhaust gas is prolonged, thereby improving the removal efficiency of the harmful substances, particularly dioxin or mercury, contained in the incinerator exhaust gas.

According to further embodiment of the present invention, in order to achieve the introduction of such a harmful substance removing powder, the harmful substance removing powder carried by pressurized air is preferably introduced with revolution in the central direction of the spray cooling chamber from the powder blowing port arranged at a midstream side of the spray cooling chamber, so that the powder is contacted and mixed with the incinerator exhaust gas revolving in the spray cooling chamber.

Further, in order to maintain the adsorption and absorption performances of the harmful substance removing powder introduced into the spray cooling chamber in the best state, it is indispensable to prevent the powder from a high temperature or wetting.

Therefore, it is important to introduce the harmful substance removing powder from the midstream side of the spray cooling chamber in order to maintain the harmnfuil substance removing powder at a possibly low temperature and in a dry state, and also to prolong the contact time with the incinerator exhaust gas as much as possible.

Where the harmful substance removing powder is introduced from the gas distribution chamber arranged at the upstream side of the spray cooling chamber. the temperature of powder elevates by the high temperature exhaust gas, and as a result, the adsorption and absorption performances are decreased.

Further, where the harmful substance removing powder is introduced into the spray zone at the upstream side of the spray cooling chamber, the powder is wetted, so that not only the adsorption and absorption performances are decreased, but also the powder tends to adhere to inner wall of the spray cooling chamber, which are undesirable.

The contact time with the incinerator exhaust gas is not sufficiently secured as an introduction position of the harmful substance removing powder approaches the downstream side of the spray cooling chamber. As a result, the removal efficiency of harmful substances, particularly dioxin or mercury, contained in exhaust gas is decreased.

As described above, regeneration of dioxins can be minimized as much as possible by maintaining the adsorption and absorption performances of the harmful substance removing powder, prolonging the contact time with exhaust gas and also extremely shortening the retention time of the incinerator exhaust gas in the vicinity of 300° C., thereby improving the removal efficiency of harmful substances, particularly dioxin or mercury, contained in exhaust gas. As a result, when the exhaust gas is allowed to pass through the subsequent treatment steps (for example, slaked lime powder or active carbon addition treatment or treatment with the bag filter), the concentration of dioxins discharged into the atmosphere can be reduced below 0.1 ng-TEQ/Nm$^3$ or less as required by the guideline of the Ministry of Health and Welfare.

This point is specifically explained below. The removal efficiency of dioxins in the subsequent steps, such as treatment with the bag filter, can achieve about 95% by adjusting exhaust gas temperature, amount of active carbon, or the like. Therefore, where concentration of dioxins prior to the treatment of the present invention, which is the pre-treatment, is 1.0 ng-TEQ/Nm$^3$, the concentration is decreased to 0.05 ng-TEQ/Nm$^3$ by passing through the post-treatment, which easily satisfies the guideline. On the other hand, in the conventional waste heat collector or rapid cooling reaction tower as shown in FIG. 12, the concentration of dioxins shows a value exceeding 10 ng-TEQ/Nm$^3$, and even if removal treatment by the post-treatment is applied, the concentration shows a value 0.5 ng-TEQ/Nm$^3$, more than 0.1 ng-TEQ/Nm$^3$ which is the guideline value.

The present invention is described in detail below by referring to the drawings.

FIG. 1 is a cross-sectional schematic view showing one example of the spray cooling chamber used in the present invention.

In FIG. 1, reference numeral 20 denotes a chamber, and a lower end portion thereof is formed in an inverted conical shape, and an upper portion thereof is formed in a nearly cylindrical shape. A gas distribution chamber 21 equipped with a revolution blade 25 is arranged at the upper potion of the chamber 20, and the upper portion is connected to an inlet duct 22 to which exhaust gas (high temperature gas) is sent from an incinerator (not shown). It is preferable for the gas distribution chamber 21 that if the exhaust gas temperature exceeds 600° C., a part of wall portion is made to form a jacket structure so as to allow a cooling water to pass therethrough, and thus inexpensive apparatus materials can be used. A rotating disk type water sprayer 23 which is a spray means of a cooling liquid is arranged at the central upper portion of the chamber 20, and this water sprayer 23 is formed such that water is sent from a water-conveyance facility 24. A dust exhaust port 26 is arranged at the lower end portion of the chamber 20, and an exhaust duct 27 which discharges exhaust gas is opened at an inverted conical shape portion 29 of the chamber 20. Reference numeral 28 is a lime powder blowing port.

A spray cooling chamber 15 is constituted as described above, and its exhaust gas treatment will now be explained. Exhaust gas (high temperature gas) sent from the inlet duct 22 is introduced into the gas distribution chamber 21. The gas distribution chamber 21 is equipped with the revolution blade 25, and a revolution flow having predetermined gas speed and revolution speed is imparted to exhaust gas by the revolution blade 25. The exhaust gas gradually goes down while revolving in the chamber 20. On the other hand, water which is a cooling liquid is sprayed from the water sprayer 23 in a circular state by a revolving disk, and is instantaneously mixed with the exhaust gas. TIC represents a temperature control device, and detects temperatures of inlet exhaust gas and outlet exhaust gas. Each value detected is subjected to feedforward and feedback, thereby controlling the amount of water sent from the water-conveyance facility 24 to the water sprayer 23.

When the exhaust gas (high temperature gas) and water are thus mixed, water sprayed in an atomized state and also in a circular state is contacted and mixed with high temperature gas having a revolution flow imparted thereto. As a result, contact efficiency between water and gas is very good, and high temperature gas of about 350 to 900° C. is rapidly cooled to drop to about 80 to 250° C. The temperature drop rate is fast uniformly in each portion of the high temperature gas, and the range between 250° C. and 350° C. can be cooled down within 1 second, which is necessary to suppress generation of dioxins. Even to fluctuate the temperature of high temperature gas and the amount of gas, the above-described rapid cooling can be achieved by adjusting and controlling a spray amount of a cooling liquid (water) sprayed. Further, adjustment of the outlet gas temperature at a predetermined temperature can be achieved by controlling spray amount of the cooling liquid.

The exhaust gas is contacted and mixed with water in the spray cooling chamber 15 to cool the temperature of the exhaust gas to a predetermined temperature, and the exhaust gas thus cooled is discharged into the downstream side from the exhaust duct 27 opened at the inverted conical portion 29 of the chamber 20. In this case, lime powder is blown into the exhaust duct 27 from the lime powder blowing port 28 to react with SOx and HCl, and those materials are removed. A part of dust contained in the exhaust gas is discharged outside in a dried state from the dust exhaust port 26 at the lower end portion of the chamber 20.

Figure 2:
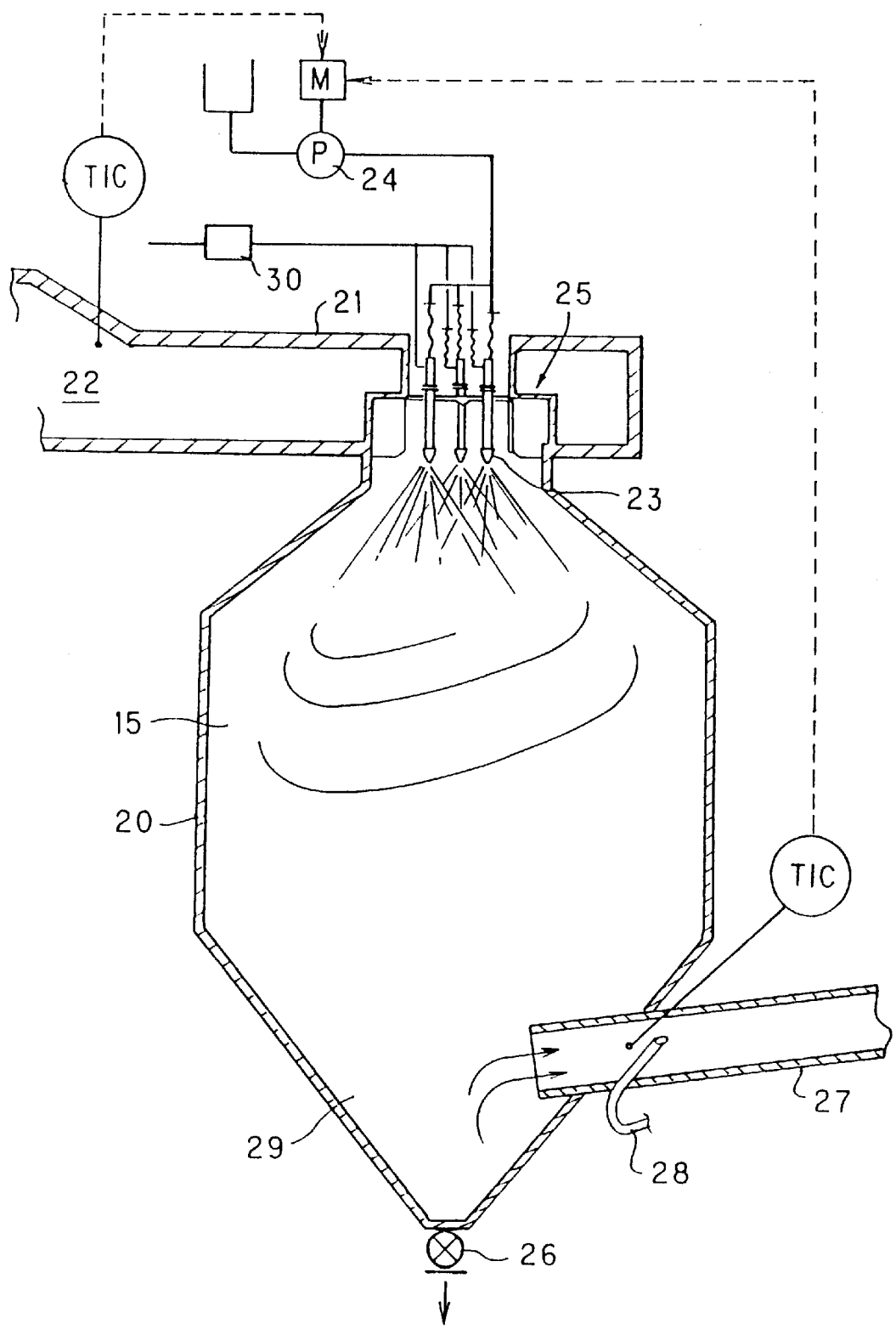
FIG. 2 is a cross-sectional schematic view showing another example of the spray cooling chamber used in the present invention.

FIG. 2 is a cross-sectional schematic view showing another example of the spray cooling chamber used in the present invention. This spray cooling chamber differs from the example shown in FIG. 1 in only that a binary fluid nozzle type or the similar nozzle type water sprayer is used in place of the rotating disk type water sprayer, and the upper portion of the chamber is formed into a conical shape.

Where the binary fluid nozzle type water sprayer is used, spray angle of water cannot be as large as in the rotating disk type. Therefore, it is preferable to form the upper portion of the chamber into a conical shape in the point of achieving efficient contact and mixing between exhaust gas and water.

Further, in the binary fluid nozzle type water sprayer 23, water sent from the water-conveyance facility 24 is sprayed together with air from a compressed air facility 30.

It is further desirable to use a liquid atomizing device having the characteristic that a droplet size decreases as the amount of liquid sent decreases, like the above two sprayers. Use of such a device enables fast and uniform cooling to fluctuation of the inlet gas temperature.

Figure 3:
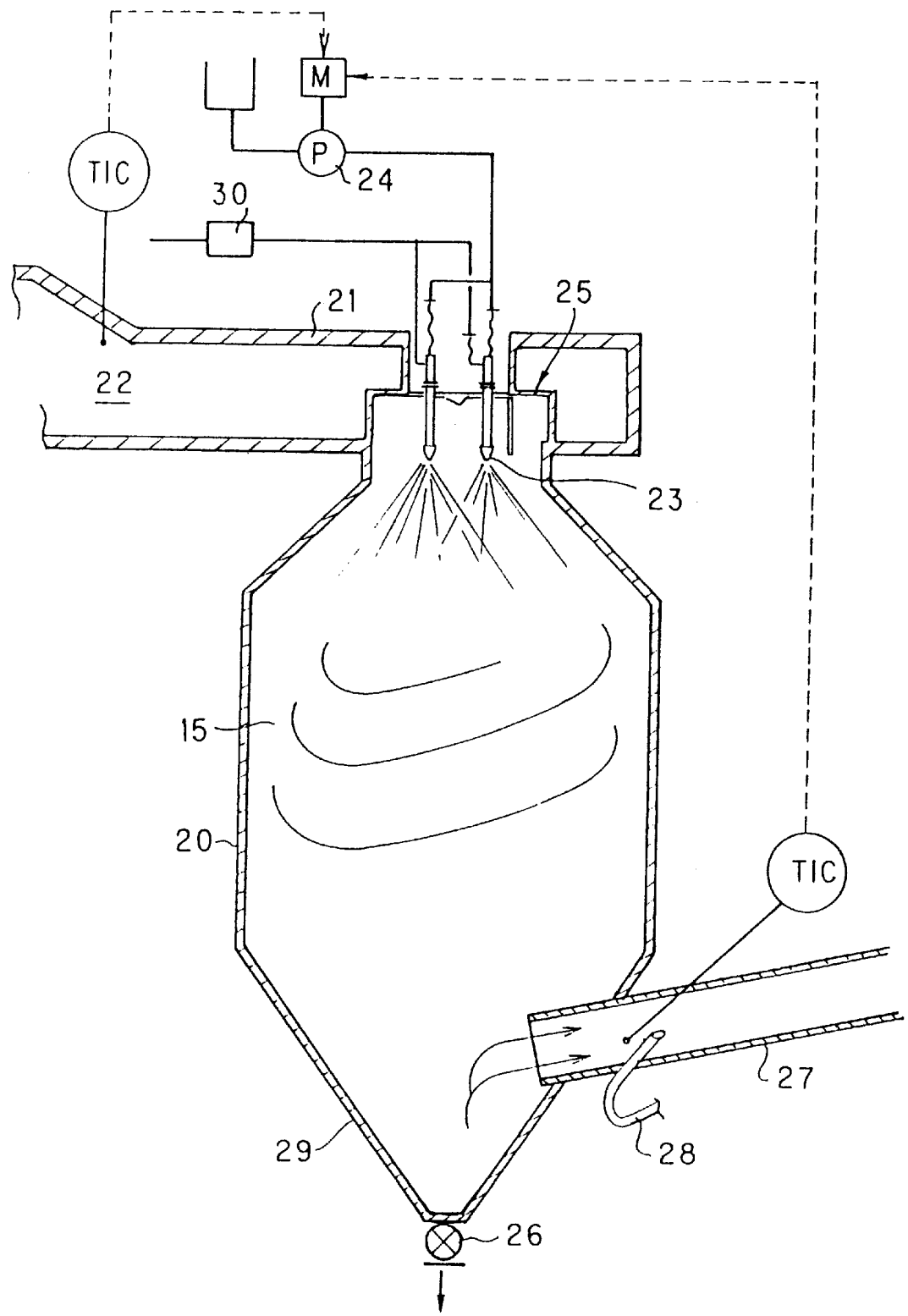
FIG. 3 is a cross-sectional schematic view showing further example of the spray cooling chamber used in the present invention.

FIG. 3 is a cross-sectional schematic view showing further example of the spray cooling chamber used in the present invention. This spray cooling chamber differs from the example shown in FIGS. 1 and 2 in only that a cooling liquid spray nozzle having a double pipe structure is used.

If the cooling liquid spray nozzle 23 is used, the cooling liquid is sprayed while revolving the same inside the double pipe structure, and high speed air is sprayed while revolving the same at the periphery thereof. As a result, the cooling liquid sprayed from the inside scatters by the high speed air sprayed from the periphery, and atomization of the cooling liquid is achieved. The degree of atomization can be adjusted by flow rate of the cooling liquid, pressure of high speed air, or the like. Preferably, the flow rate of the cooling liquid is 0.1 to 100 kg/min per pipe, and the pressure of high speed air is 5 to 40 kPa. By the above adjustment, spray conditions are obtained that an average particle size of liquid droplets decreases as flow rate of the cooling liquid decreases.

Example of the double pipe structure cooling liquid spray nozzle 23 preferably used includes the cooling liquid spray nozzle comprising a pressure revolution nozzle for blowing liquid, and a cylindrical body for blowing gas at high speed, arranged around the nozzle, the top end portion of the nozzle having a tapered structure, as disclosed in U.S. Pat. Nos. 5,499,768 and 5,227,017. This cooling liquid spray nozzle involves two atomization stages, and a primary atomization is performed with pressure possessed by the liquid itself of the pressure revolving nozzle. This primary atomization is that the liquid is sprayed in a conical and circular shape. Liquid droplets thus primarily atomized are then allowed to concentratedly collide with high speed gas blown from the cylindrical body for blowing to thereby perform a secondary atomization. As a result, even when liquid is sprayed at low pressure, atomization of liquid can be achieved, and also control of size of liquid droplets can be conducted.

Figure 4:
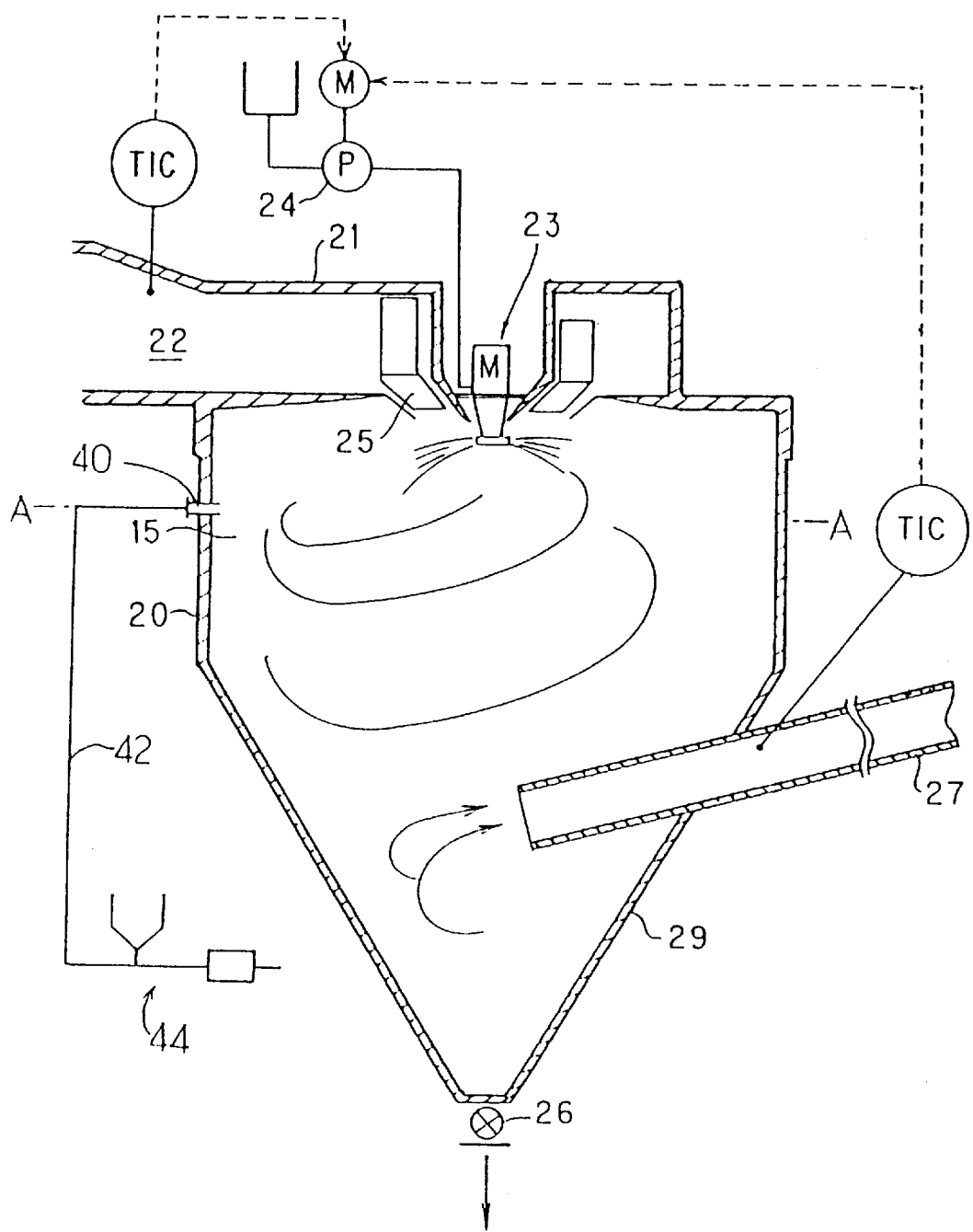
FIG. 4 is a cross-sectional schematic view showing still another example of the spray cooling chamber used in the present invention.

FIG. 4 is a cross-sectional schematic view showing still further example of the spray cooling chamber used in the present invention.

The example of FIG. 4 is almost the same as the example shown in FIG. 1, but differs from the example shown in FIG. 1 in that a harmful substance removing powder is blown into the chamber.

In FIG. 4, a powder blowing port 40 for introducing the harmful substance removing powder with revolution in the central direction of the chamber 20 is arranged at a midstream side of the chamber 20. The harmful substance removing powder is fed to this powder blowing port 40 from a powder transport facility 44 for transporting the powder with pressurized air through a powder transport pipe 42.

Thus, the harmful substance removing powder transported with pressurized air is sprayed so as to introduce with revolution in the central direction of the chamber 20 from the powder blowing port 40 arranged at the midstream side of the chamber 20, thereby contacting and mixing with an incinerator exhaust gas after cooling treatment.

As a result, adsorption and absorption performances of the harmful substance removing powder can be maintained in the best state, and the contact retention time with the incinerator exhaust gas can be prolonged about 2 times as compared with the conventional time. Consequently, reactivity between the incinerator exhaust gas and the harmful substance removing powder increases, and removal efficiency of harmful substances, particularly dioxin or mercury, contained in the incinerator exhaust gas can be improved.

Further, since HCl or SOx, which is the harmful substance contained in incinerator exhaust gas, can be removed at the midstream portion of the chamber 20, thereby reducing corrosion at the downstream portion of the chamber 20.

Figure 7:
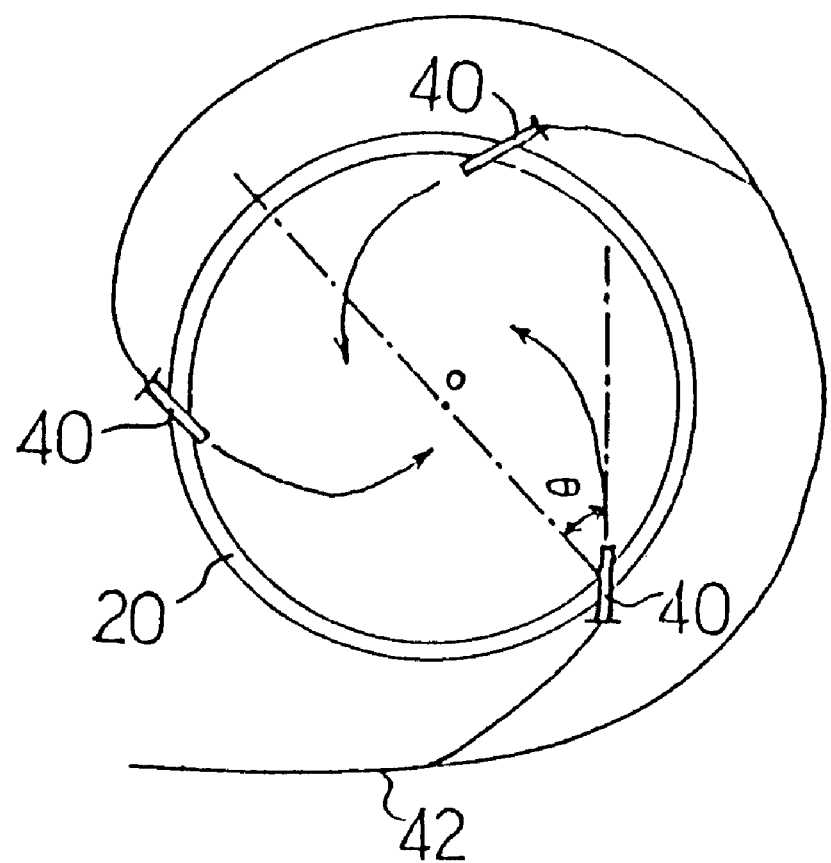
FIG. 7 is a cross-sectional view of the spray cooling chamber shown in FIGS. 4 to 6 taken along A—A.

At this time, it is preferable that a predetermined number (for example, 3) of the powder blowing ports 40 is arranged with an angle θ of 5 to 45° to the direction of center O of the midstream portion of the chamber 20, as shown in FIG. 7.

By this arrangement, contact and mixing of the incinerator exhaust gas and the harmful substance removing powder is well conducted, so that the removal efficiency of harmful gas contained in the incinerator exhaust gas can be improved.

The number of the powder blowing ports 40 is not particularly limited, and an appropriate change can be made in order to achieve the above-described object.

The harmful substance removing powder used in the present invention is preferably any one of slaked lime, active carbon or return dust, or a combination thereof.

Those materials are appropriately selected and adjusted depending on the concentration of harmful substances contained in the incinerator exhaust gas, or the kind thereof. In particular, where the generation amount of HCl or SOx contained in the incinerator exhaust gas is large, a large amount of the harmful substance removing powder (slaked lime powder) is required. Therefore, the amount of the harmful substance removing powder used can be decreased by effectively using a return dust containing unreacted slaked lime or unreacted active carbon.

Figure 5:
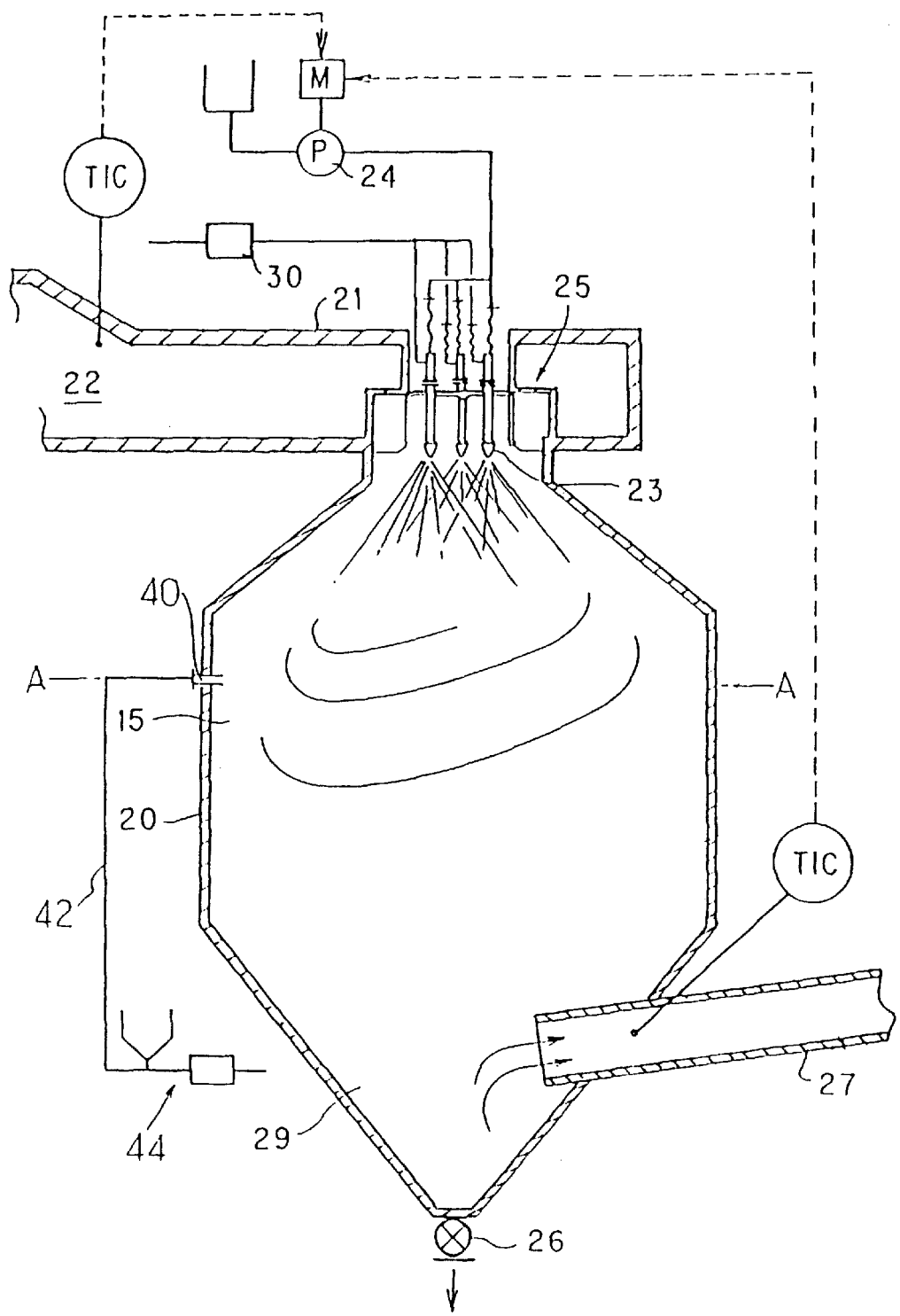
FIG. 5 is a cross-sectional schematic view showing still further example of the spray cooling chamber used in the present invention.
Figure 6:
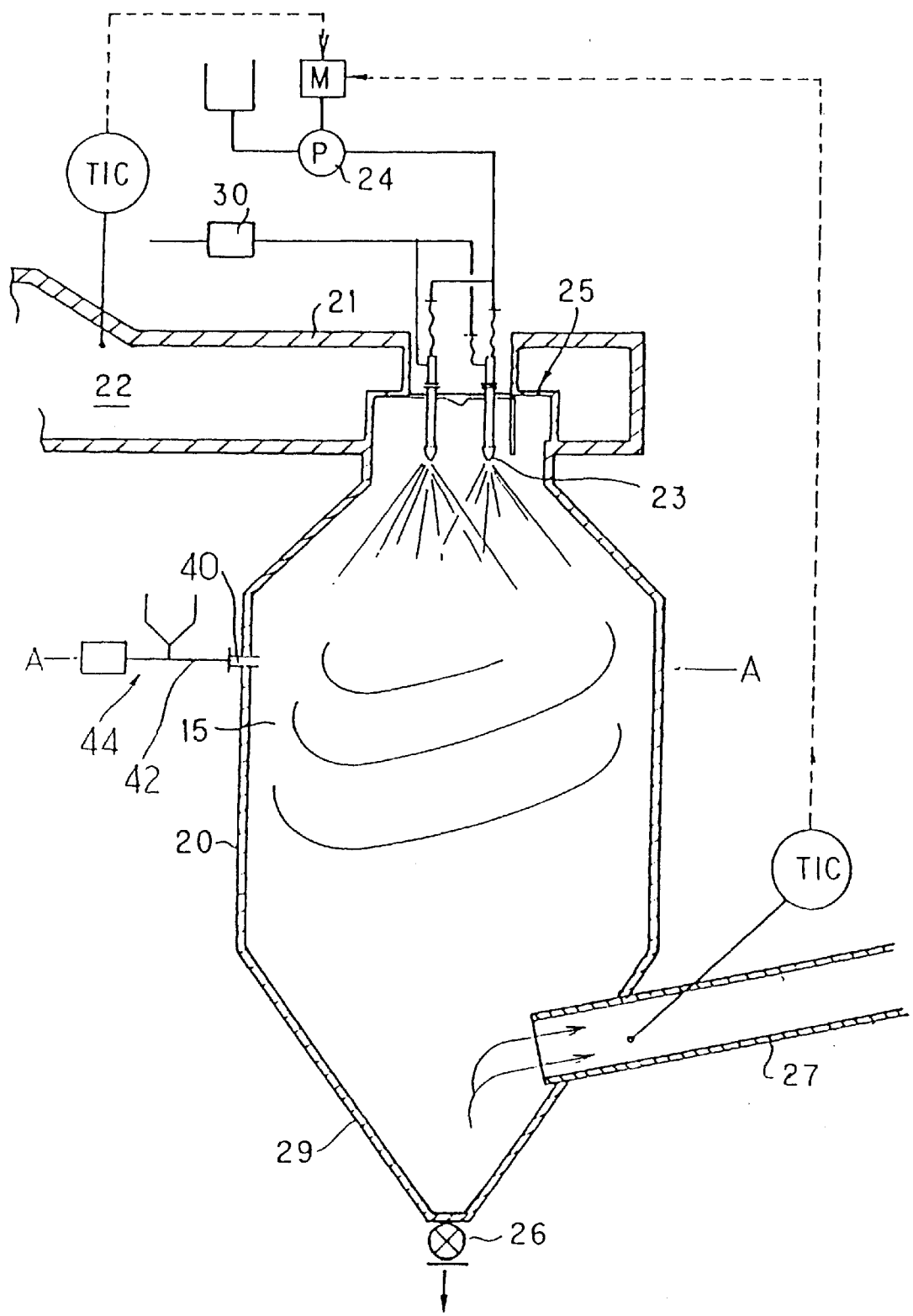
FIG. 6 is a cross-sectional schematic view showing still further example of the spray cooling chamber used in the present invention.

FIGS. 5 and 6 each show a cross-sectional schematic view showing still further example of the spray cooling chamber used in the present invention. Those examples differ from the example shown in FIG. 4 only in that binary fluid nozzle type, double pipe structure spray nozzle type, or similar nozzle type water sprayer is used in place of the rotating disk type water sprayer, and the upper portion of the chamber is formed into a conical shape.

When the binary fluid nozzle type or double pipe structure nozzle type water sprayer 23 is used, the spray angle of the water is not so large as compared with that in the rotating disk type. Therefore, it is preferable to form the upper portion of the chamber into a conical shape in the point of achieving efficient contact and mixing between exhaust gas and water.

As in the above sprayer, it is further desirable to use an atomizing device having the characteristic that the size of liquid droplets decreases as the amount of liquid sent decreases. As a result, rapid and uniform cooling can be conducted to fluctuation of the inlet gas temperature.

Figure 8:
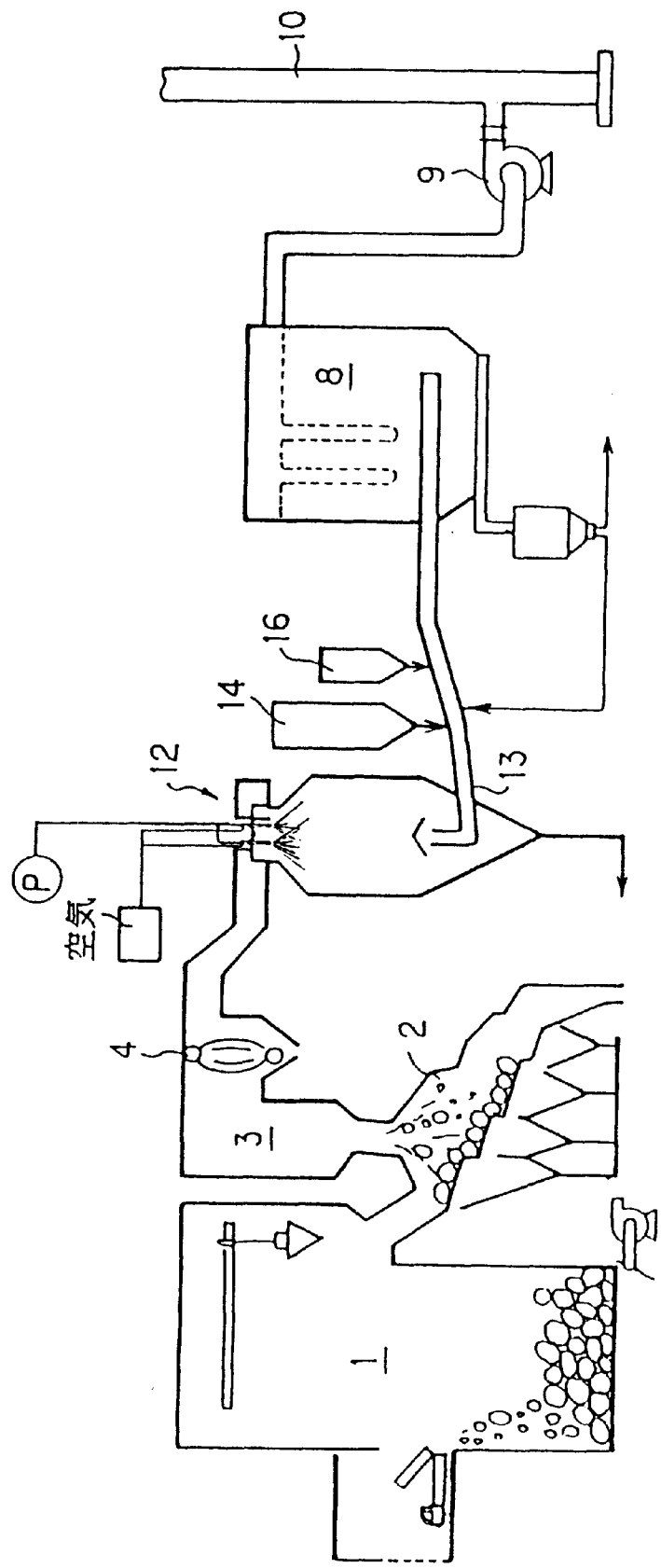
FIG. 8 is an explanatory view showing one example of an incinerator plant in which an apparatus of treating combustion furnace exhaust gas according to the present invention is combined.

FIG. 8 is a cross-sectional schematic view showing one example of the incinerator plant in which an apparatus of treating combustion furnace exhaust gas according to the present invention is combined.

Figure 11:
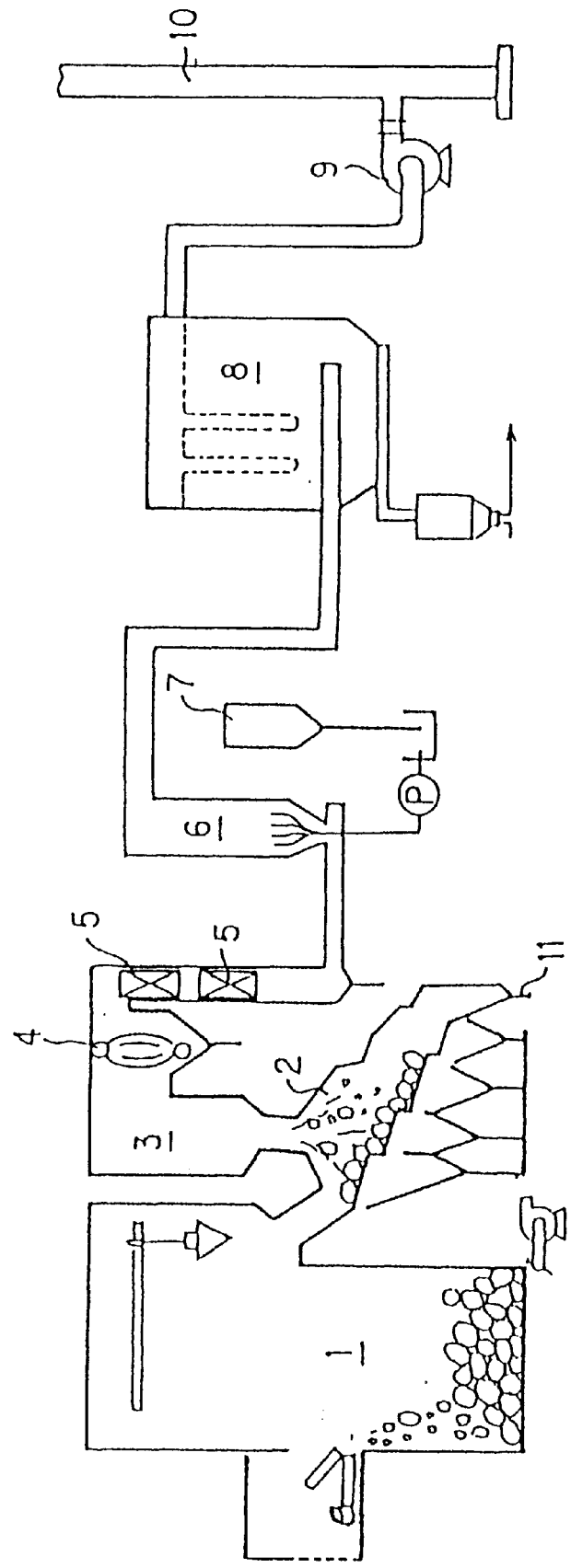
FIG. 11 is an explanatory view showing an example of an incinerator plant of municipal refuse having conventional exhaust gas treating apparatus arranged together.

In the apparatus shown in FIG. 8, the constitution of a refuse dump pit 1, an incinerator 2, a secondary combustion furnace 3, and a waste heat boiler 4 are the same as the constitution of FIG. 11.

Heat recovery is conducted with the waste heat boiler 4, and exhaust gas (high temperature gas) having a slightly dropped temperature is then introduced into a spray cooling chamber 12, where the exhaust gas is rapidly cooled to a predetermined temperature. The cooled exhaust gas is discharged from the spray cooling chamber 12 via an exhaust duct 13. In the course of the exhaust duct 13, slaked lime powder is blown from a slaked lime powder storage tank 14 to react with SOx and HCl contained in the exhaust gas, and those materials are removed. The amount of slaked lime powder blown is preferably 2 to 4 times the equivalent of SOx or HCl contained in exhaust gas.

Active carbon is fed in the exhaust duct 13 from an active carbon storage tank 16, and heavy metals such as mercury, or dioxins, contained in exhaust gas are further removed. The amount of active carbon fed is preferably in a range of 0.05 to 0.30 g/Nm$^3$, although depending on dust concentration, slaked lime amount, circulating dust amount or the like.

The exhaust gas reacted with and adsorbed on the powder having SOx, HCl, heavy metals and dioxins added thereto is led to a bag filter 8, where solid-gas separation is performed, and smoke dust, HCl, SOx, heavy metals and dioxins, which remain in the exhaust gas, are removed. A part of dust separated by the bag filter 8 can be circulated to the exhaust duct 13. Further, depending on arrangement plan of incinerator plant, the spray cooling chamber can freely be arranged, such as horizontal type, upside-down type or slant type.

The exhaust gas having passed through the bag filter 8 is induced by an induced draft fan 9, and discharged into the atmosphere from a chimney 10.

Figure 9:
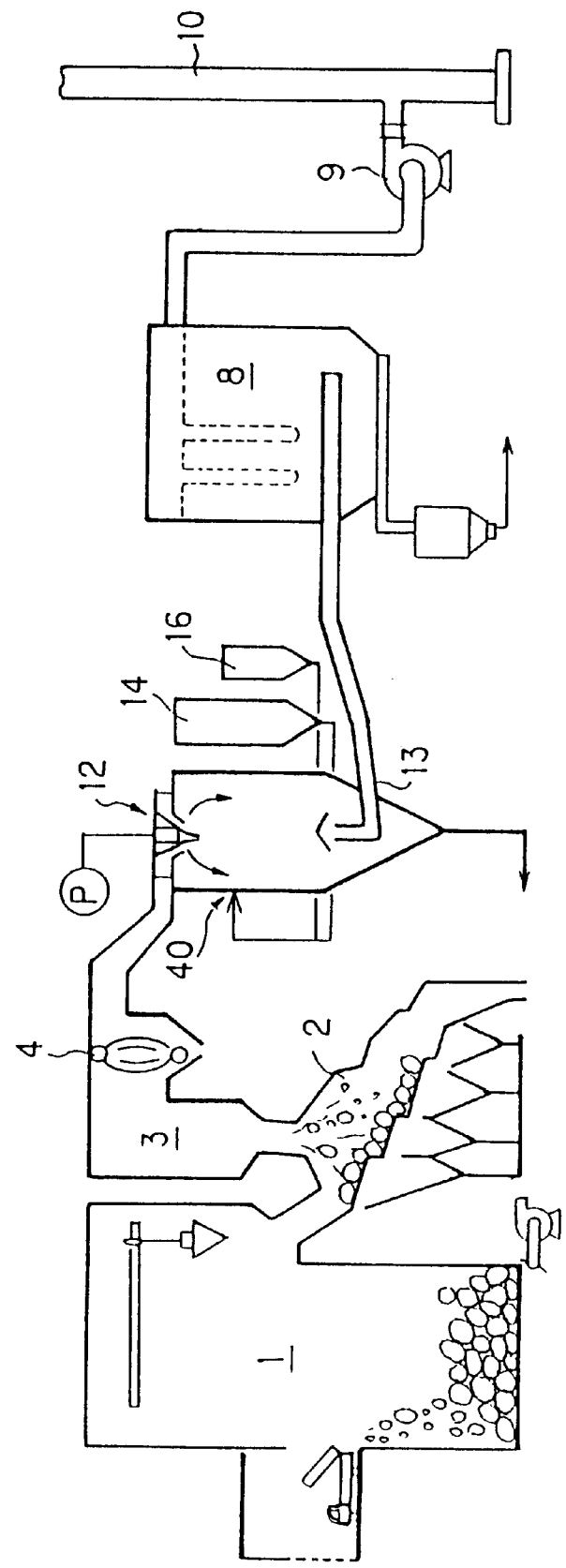
FIG. 9 is an explanatory view showing another example of an incinerator plant in which the apparatus of treating combustion furnace exhaust gas according to the present invention is combined.

FIG. 9 is an explanatory view showing another example of the incinerator plant in which an apparatus of treating incinerator exhaust gas according to the present invention is combined.

Heat recovery is conducted with the waste heat boiler 4, and the incinerator exhaust gas (high temperature gas) having a slightly dropped temperature is then introduced into a spray cooling chamber 12, where the exhaust gas is rapidly cooled to a predetermined temperature. The cooled incinerator exhaust gas is further subjected to reaction and adsorption removal of harmful substances (SOx, HCl, heavy metals and dioxins) using a harmful substance removing powder introduced with revolution from the slaked lime powder storage tank 14 and the active carbon storage tank 16 via a powder blowing port 40 at the midstream side of the spray cooling chamber 12. A part of the harmful substance removing powder which reaction adsorbs harmful substances is discharged outside from the spray cooling chamber 12. The exhaust gas after treatment is accompanied with most portion of the harmful substance removing powder having harmful substances reaction adsorbed thereon, and is discharged from the spray cooling chamber 12 via the exhaust duct 13.

The slaked lime powder reacts with SOx and HCl contained in the incinerator exhaust gas, thereby removing those substances. The amount of the slaked lime powder blown is preferably 2 to 4 times the equivalent of SOx and HCl contained in the exhaust gas. Further, the active carbon adsorbs harmful substances including heavy metals such as mercury, and dioxins, contained in the incinerator exhaust gas, and removes the same. The amount of the active carbon fed is preferably 0.05 to 0.30 g/Nm$^3$, although it changes depending on dust concentration or slaked lime amount.

The exhaust gas which is accompanied with most portion of the harmful substance removing powder having harmful substances, such as SOx, HCl, heavy metals and dioxins, reaction adsorbed thereon is then led to the baa filter 8 which is a dust collector, where solid-gas separation is performed, and smoke dust and harmful substances, such as HCl, SOx, heavy metals and dioxins, which are remained in the exhaust gas, are removed.

Figure 10:
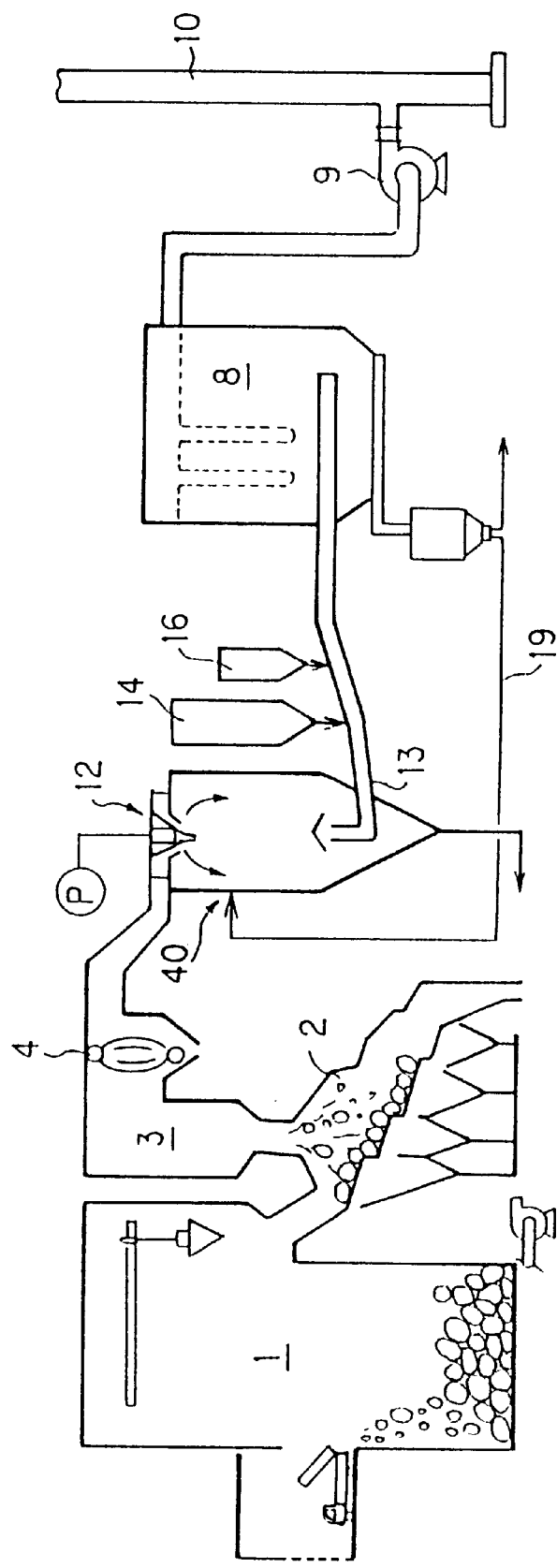
FIG. 10 is an explanatory view showing further example of an incinerator plant in which the apparatus of treating combustion furnace exhaust gas according to the present invention is combined.

FIG. 10 is an explanatory view showing further example of the incinerator plant in which an apparatus of treating incinerator exhaust gas according to the present invention is combined.

Heat recovery is conducted with the waste heat boiler 4, and the incinerator exhaust gas (high temperature gas) having a slightly dropped temperature is then introduced into a spray cooling chamber 12, where the exhaust gas is rapidly cooled to a predetermined temperature. The cooled incinerator exhaust gas is further subjected to removal of harmful substances (SOx, HCl, heavy metals and dioxins) having a high concentration by the return dust introduced with revolution via the powder blowing port 40 at the midstream side of the spray cooling chamber 12. As a result about 40 to 90% of harmful substances are separated and recovered. Most portion of the harmful substance removing powder having harmful substances reaction adsorbed thereon is discharged from the spray cooling chamber 12. The exhaust gas after treatment is accompanied with a part of the harmful substance removing powder having harmful substances reaction adsorbed thereon, and is discharged from the spray cooling chamber 12 via the exhaust duct 13. In the course of the exhaust duct 13, fresh slaked lime is blown from the slaked lime storage tank 14 to react with SOx and HCl contained in the incinerator exhaust gas, thereby removing those substances. The amount of the slaked lime blown is preferably 1.2 to 3 times the equivalent of SOx and HCl contained in the exhaust gas.

Fresh active carbon is fed to the exhaust pipe 13 from the active carbon storage tank 16, where heavy metals such as mercury, and dioxins, which are harmful substances contained in exhaust gas are adsorbed and removed. The amount of active carbon fed is preferably 0.05 to 0.30 g/Nm$^3$, although it changes depending on dust concentration, slaked lime amount, circulating dust amount, and the like.

The exhaust gas which is accompanied with the harmful substance removing powder having harmful substances, such as SOx, HCl, heavy metals and dioxins, reaction adsorbed thereon is then led to the bag filter 8 which is a dust collector, where solid-gas separation is performed, and smoke dust and harmful substances, such as HCl, SOx, heavy metals and dioxins, which are remained in the exhaust gas are removed.

In this example, since the dust separated with the bag filter 8 contains unreacted slaked lime or unreacted active carbon, a part of the dust is returned with a return duct 19, and is used as a harmful substance removing powder for introducing with revolution from the powder blowing port 40 at the midstream side of the spray cooling chamber 12. Thus, in this example, high concentration harmful substances in incinerator exhaust gas are preliminarily removed inside the spray cooling chamber 12 using the return dust containing unreacted slaked lime or unreacted active carbon. Therefore, the amount of fresh slaked lime and active carbon introduced into the exhaust duct 13 can be decreased without decreasing the removal efficiency.

Further, the discharged amount of the dust containing the harmful substance removing powder can also be decreased by effectively utilizing the return duct containing unreacted slaked lime and unreacted active carbon.

In addition, deliquescent $CaCl_2$ which is a reaction product of slaked lime and HCl, and is a cause of clogging of filter in the bag filer and blockage in the return duct 19 can be removed inside the spray cooling chamber 12, and this enables safe operation of the apparatus.

The present invention is described in more detail by reference to the following examples, but it should be understood that the invention is not limited thereto.

Using a spray cooling chamber which used each water sprayer of the spray nozzle double pipe structure, binary fluid nozzle, high pressure nozzle and rotating disk type, each having dimensions and performances as shown in Table 1, a method of cooling exhaust gas was designed.

TABLE 1

|  | Spray nozzle with double pipe structure | Binary fluid nozzle | High pressure nozzle | Rotating disk type |
|---|---|---|---|---|
| Diameter of apparatus (mφ) | 4.5 | 5.5 | 6.0 | 8.5 |
| Height of straight bulge portion (m) | 20 | 15 | 20 | 10 |
| Average retention time (sec) | 9 | 10 | 15 | 16 |
| Number of nozzle | 12 | 96 | 12 | 1 |
| Maximum water pressure (kg/cm$^2$) | 30 | 5 | 200 | 2 |
| Average particle size (μm) | 70 | 65 | 150 | 80 |
| Flow rate per nozzle (1/h) | 1400 | 180 | 1400 | 17000 |
| Spray angle (degree) | 25 | 5 | 90 | 180 |
| Pressure of air fed(mAq) | 4 | 30 | — | — |

[exhaust gas]

Flow rate of inlet gas: 120,000 kg/hr

Temperature of inlet gas: 500° C.

Inlet gas speed: 25 m/sec

Revolving speed of inlet gas: 3 rad/sec

Concentration of dioxins: 1.0 ng/Nm$^3$

Dust concentration: 6 g/Nm$^3$

[spray liquid]

Water amount: about 17 ton/hr

Exhaust gas was cooled using various spray cooling chambers shown above. In the case of the spray nozzle with double pipe structure, the temperature of outlet gas can be reduced to 130° C., and the range between 250° C. and 350° C. can be cooled down within 1 second. As a result, the concentration of dioxins in exhaust gas is increased only from 1.0 ng (TEQ)/Nm$^3$ to 1.3 ng (TEQ)/Nm$^3$, thus making it possible to suppress regeneration of dioxins. Further, the concentration of dioxins in exhaust gas dust-collected and cleaned with a bag filter after adding slaked lime powder, active carbon, and the like can be reduced to 0.1 ng (TEQ)/Nm$^3$ or less.

On the other hand, even where water sprayers of binary nozzle, high pressure nozzle and rotating disk type are used, the temperature of outlet gas can be decreased to 150° C., and the concentration of dioxins in exhaust gas is increased only from 1.0 ng (TEQ)/Nm$^3$ to 2.0 ng (TEQ)/Nm$^3$. Thus, since regeneration of dioxins can be suppressed, the concentration of dioxins in exhaust gas dust-collected and cleaned with a bag ffilter after adding slaked lime powder, active carbon, and the like can be reduced to 0.1 ng (TEQ)/Nm$^3$ or less. However, in the case of using binary nozzle, uniform cooling in the chamber is difficult, and a large number of nozzles were required. Further, compressed air (pressure is 2 kg/cm$^2$ or more) is necessary, and power cost was high as compared with the double pipe structure. In the case of using the high pressure nozzle, atomnization is difficult in the operation in rising and stopping, in addition to maintenance of high pressure pipings and corrosion due to dew condensation. As a result, effective cooling cannot be performed. Further, in the case of using the rotating disk type, there are the problems that maintenance must be made by an expert in the art, many safeguards to machines are required for a high temperature, countermeasures at the time of emergency stop or at the time of troubles in rotating machines are difficult, and pipings cannot freely be carried out.

Contrary to this, in the case of using cooling liquid spray nozzle with double pipe structure, stable operation is possible regardless of rising and stopping, and uniform cooling in the chamber is excellent. Further, operation cost is inexpensive, and maintenance is easy.

(Examples 1 to 2 and Comparative Example 1)

Using the apparatus of treating the incinerator exhaust gas according to the present invention as shown in FIG. 9 and the conventional treating apparatus as shown in FIG. 11, exhaust gas having concentration of HCl and dioxins as shown in Table 2 from general refuse incinerator was treated. Conditions of exhaust gas amount, and the like, and the results obtained are shown in Table 2.

TABLE 2

|  | Comparative Example 1 | Example 1 | Example 2 |
|---|---|---|---|
| Amount of exhaust gas (kg/hr) Spray cooling chamber | 120,000 | 120,000 | 120,000 |
| Inlet gas temperature (° C.) | 300 | 300 | 450 |
| Hcl concentration of exhaust gas (mg/Nm$^3$) | 1000 | 1000 | 1000 |
| Dioxin concentration of exhaust gas (ng-TEQ/Nm$^3$) | 10 | 10 | 2 |
| Amount of active carbon introduced (mg/kg (gas)) | 100 | 100 | 100 |
| Equivalent of slaked lime introduced | 2.5 | 2.5 | 2.5 |
| Blowing location of active Carbon and slaked lime | Outlet duct | In spray cooling chamber | In spray cooling chamber |
| Exhaust gas temperature of bag filter inlet (° C.) | 150 | 140 | 140 |
| HCl concentration of exhaust gas of bag filter outlet (mg/Nm$^3$) | 100 | 70 | 70 |
| Dioxin concentration of bag filter outlet (ng-TEQ/Nm$^3$) | 0.5 | 0.25 | 0.05 |
| Removal efficiency of dioxin (%) | 95 | 97.5 | 97 |

As is apparent from Table 2, in Example 1 the structure of spray cooling chamber and gas blowing were changed from the conventional ones to be appropriate ones. As a result, the exhaust gas temperature could be decreased to 140° C. Further, by changing the blowing position of slaked lime and active carbon, HCl concentration and dioxins concentration could be reduced as compared with the conventional apparatus.

Further, in Example 2, by decreasing a high temperature of the exhaust gas inlet in the spray cooling chamber, the exhaust gas passes through regeneration zone of dioxins is passed within a short period of time. As a result, the dioxin concentration can be further decreased to be lower than the guideline value.

(Examples 3 to 5 and Comparative Example 2)

Using the apparatus of treating incinerator exhaust gas of the present invention as shown in FIG. 10 and the conventional treating apparatus as shown in FIG. 11, exhaust gas having HCl and dioxin concentrations as shown in Table 3. The exhaust gas contained many plastics (vinyl chloride and the like) discharged from industrial waste incinerator. Conditions such as exhaust gas amount, and the results obtained are shown in Table 3.

TABLE 3

|  | Comparative Example 2 | Example 3 | Example 4 | Example 5 |
|---|---|---|---|---|
| Amount of exhaust gas (kg/hr) Spray cooling chamber | 50,000 | 50,000 | 50,000 | 50,000 |
| Inlet gas temperature (° C.) | 270 | 270 | 450 | 450 |
| HCl concentration of exhaust gas (mg/Nm$^3$) | 3,000 | 3,000 | 3,000 | 3,000 |
| Dioxin concentration of exhaust gas (ng-TEQ/Nm$^3$) | 10 | 10 | 2 | 2 |
| Amount of active carbon introduced (mg/kg (gas)) | 100 | 100 | 100 | 80 |
| Equivalent of slaked lime introduced | 2.5 | 2.5 | 2.5 | 2.0 |
| Blowing location of active carbon and slaked lime | Outlet duct | Outlet duct | Outlet duct | Outlet duct |
| Blowing location of return dust | None | In spray cooling chamber | In spray cooling chamber | In spray cooling chamber |
| Exhaust gas temperature of bag filter inlet (° C.) | 150 | 140 | 140 | 140 |
| HCl concentration of exhaust gas of bag filter outlet (mg/Nm$^3$) | 300 | 200 | 200 | 300 |
| Removal efficiency of Hcl (%) | 90 | 93.3 | 93.3 | 90 |
| Dioxin concentration of bag filter outlet (ng-TEQ/Nm$^3$) | 0.5 | 0.3 | 0.06 | 0.1 |
| Removal efficiency of dioxin (%) | 95 | 97 | 97 | 95 |

As is apparent from Table 3, Example 3 is an example that half amount of collected amount in a bag filter was blown in the spray cooling chamber as a return dust, and removal efficiency of harmful gas could be increased. In Example 4, dioxin outlet concentration could be reduced by elevating the exhaust gas inlet temperature. Further, in Example 5, consumption amount of slaked lime and active carbon could be reduced while maintaining the guideline value. Further, final waste amount could be reduced, and profitability could be improved.

What is claimed is:

1. A method of cooling incinerator exhaust gas for a cleaning treatment of high temperature exhaust gas discharged from a waste incinerator, the method comprising introducing the incinerator exhaust gas into a spray cooling chamber having a gas distribution chamber at an upstream side thereof while imparting a revolving flow to the incinerator exhaust gas, mixing the incinerator exhaust gas with a cooling liquid sprayed in the spray cooling chamber to rapidly cool the temperature of the incinerator exhaust gas to a predetermined temperature or less, and removing dust from the incinerator exhaust gas in a dried state, wherein a gas speed of the exhaust gas in the gas distribution chamber is 10 to 50 m/sec, and a revolution speed of the gas is 1 to 30 rad/sec.

2. The method of cooling incinerator exhaust gas as claimed in claim 1, wherein the gas having an inlet temperature of 250 to 950° C. is rapidly cooled to an outlet temperature of 70 to 250° C.

3. The method of cooling incinerator exhaust gas as claimed in claim 1, wherein the cooling liquid is sprayed in droplets having an average particle size of 20 to 180 μm, and a spraying angle is 5 to 180°.

4. An apparatus for cooling incinerator exhaust gas for a cleaning treatment of high temperature exhaust gas discharged from a waste incinerator, the cooling apparatus comprising:

a chamber having a lower end portion thereof formed in the shape of an inverted cone;

a gas distribution chamber arranged at an upstream side of the chamber;

a revolution blad positioned within the gas distribution chamber;

spraying means for introducing cooling liquid into the chamber, said spraying means being arranged at a central upper portion of the chamber;

a dust exhaust port arranged at a lower end portion of the chamber; and an exhaust duct arranged on the chamber.

5. The apparatus of cooling incinerator exhaust gas as claimed in claim 4, wherein a part of a wall portion constituting the gas distribution chamber has a jacket structure.

6. The apparatus of cooling incinerator exhaust gas as claimed in claim 4, wherein the spraying means of the cooling liquid is a rotating disk liquid sprayer.

7. An apparatus of cooling incinerator exhaust gas for a cleaning treatment of high temperature exhaust gas discharged from an incinerator of wastes in a post-step, the cooling apparatus comprising:

a chamber having a lower end portion thereof formed into a nearly cylindrical shape of an inverted conical shape;

a gas distribution chamber arranged at an upstream side of the chamber; and a cooling liquid spray nozzle with a double pipe structure arranged at a central upper portion of the chamber, in which the cooling liquid passes its inside, and pressurized air passes its periphery.

8. The apparatus of cooling incinerator exhaust gas as claimed in claim 7, wherein the cooling liquid spray nozzle conducts atomization of the cooling liquid in a manner such that the cooling liquid having a flow rate of 0.1 to 100 kg/min gushes with revolution in the inside of the double pipe structure, and the pressurized air having a pressure of 5 to 40 kPa gushes with revolution in the periphery thereof.

9. A method of treating incinerator exhaust gas by cooling high temperature exhaust gas discharged from an incinerator of wastes, adding a harmful substance removing powder to the cooled exhaust gas, and collecting a dust, thereby cleaning the exhaust gas, the treating method comprising:

introducing the incinerator exhaust gas into a spray cooling chamber having a gas distribution chamber at an upstream side thereof while imparting a revolving flow to the incinerator exhaust gas;

mixing the incinerator exhaust gas with a cooling liquid sprayed in the spray cooling chamber, thereby rapidly cooling the incinerator exhaust gas to a predetermined temperature or less;

blowing a harmful substance removing powder from a midstream side of the spray cooling chamber to contact and mix with the incinerator exhaust gas, thereby reaction adsorbing the harmful substances contained in the incinerator exhaust gas on the harmful substance removing powder; and separating the harmful substance removing powder having the harmful substances reaction adsorbed thereon in a dust collector arranged at a post-stream side of the spray cooling chamber together with a dust.

10. The method of treating incinerator exhaust gas as claimed in claim 9, wherein the harmful substance removing powder is carried with pressurized air, and is introduced with revolution in a central direction of the spray cooling chamber from a powder blowing port arranged in a side wall at a midstream side of the spray cooling chamber.

11. The method of treating incinerator exhaust gas as claimed in claim 9, wherein the gas having an inlet temperature of 250 to 450° C. is rapidly cooled to an outlet temperature of 70 to 200° C.

12. The method of treating incinerator exhaust gas as claimed in claim 9, wherein a return dust containing spent unreacted slaked lime and unreacted active carbon is used as the harmful substance removing powder blown in the spray cooling chamber, and a fresh harmful substance removing powder is used in a post-stream side of the spray cooling chamber.

13. The method of treating incinerator exhaust gas as claimed in claim 9, wherein the harmful substance removing powder is any one of slaked lime, active carbon, return dust, and a combination thereof.

14. An apparatus of treating an incinerator exhaust gas for cleaning by cooling high temperature exhaust gas discharged from an incinerator of wastes, adding a harmful substance removing powder to the exhaust gas, and collecting a dust, the treating apparatus comprising:

a chamber having a lower end portion formed into a nearly cylindrical shape of an inverted conical shape;

a gas distribution chamber arranged at an upstream side of the chamber;

a spraying means of a cooling liquid arranged at a central upper portion of the chamber;

a blowing port of the harmful substance removing powder arranged at a midstream side of the chamber;

a dust exhaust port arranged at a downstream end portion of the chamber;

an exhaust pipe arranged on the chamber; and a dust collector arranged at a post-stream side from the chamber.

15. The apparatus of treating incinerator exhaust gas as claimed in claim 14, wherein the blowing port of the harmful substance removing powder is arranged such that the harmful substance removing powder is blown at an angle of 5 to 45' to a central direction of the chamber.

16. The apparatus of treating incinerator exhaust gas as claimed in claim 14, wherein the spraying means of the cooling liquid is any one of rotating disk, binary fluid nozzle and spray nozzle of double pipe structure.

17. The apparatus of treating incinerator exhaust gas as claimed in claim 14, wherein a part of a wall side constituting the gas distribution chamber is a jacket structure.

* * * * *